Aug. 16, 1938.　　　　V. T. BUGGE　　　　2,126,729
DISPLAY DEVICE
Filed March 12, 1937　　　　3 Sheets-Sheet 1
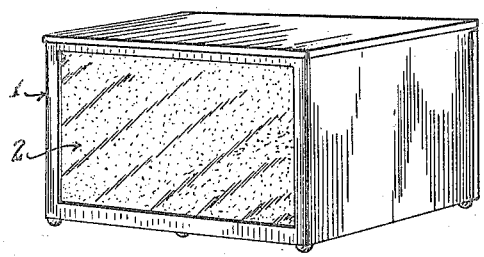
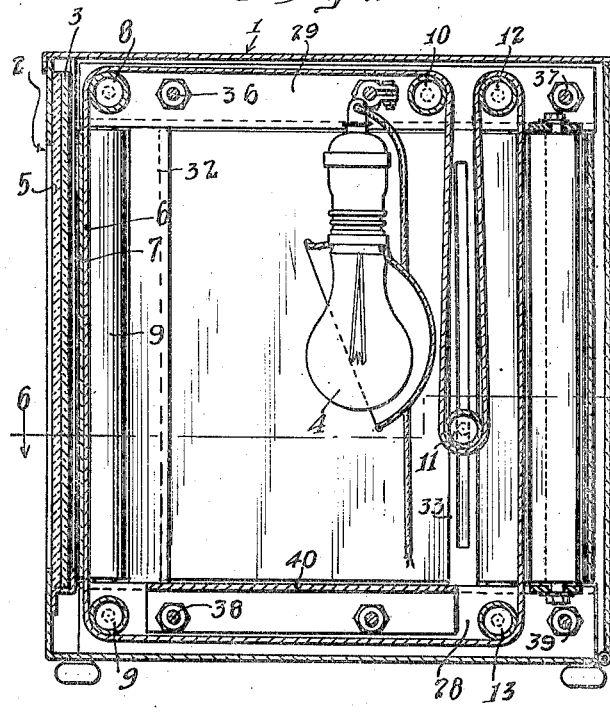
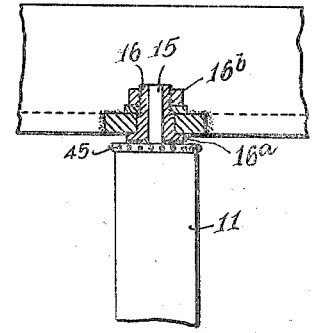
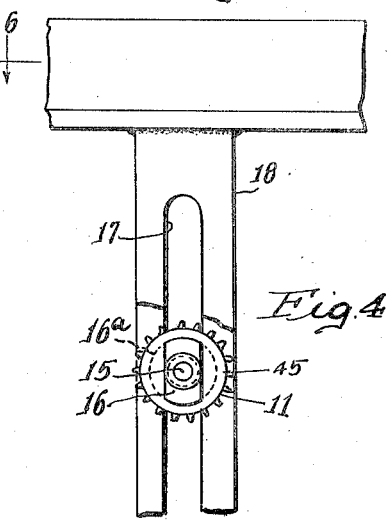
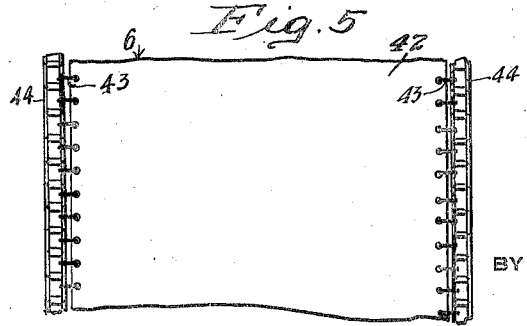
INVENTOR.
Vernon T. Bugge
BY Lyon & Lyon
ATTORNEYS

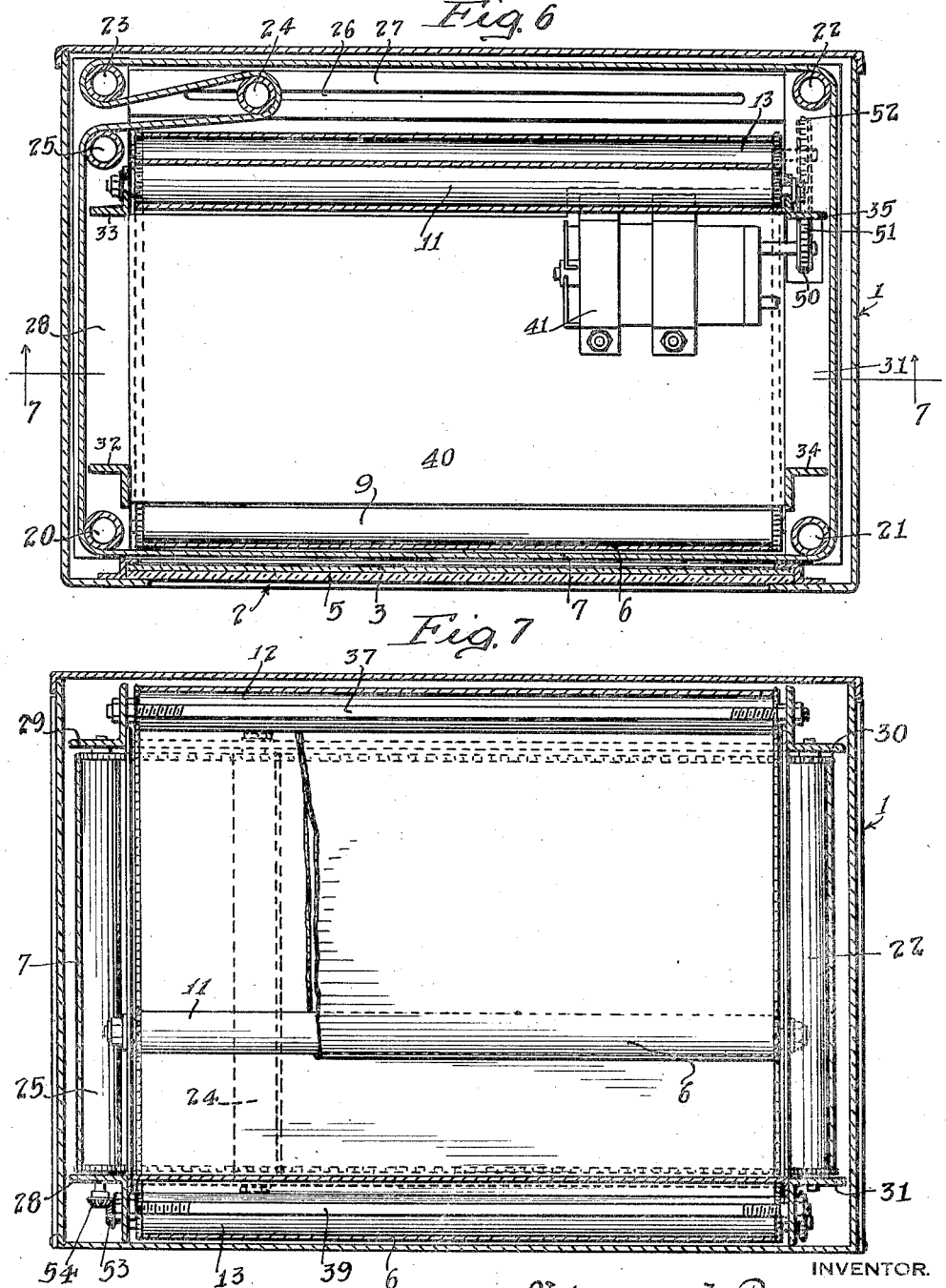

Aug. 16, 1938.     V. T. BUGGE     2,126,729
DISPLAY DEVICE
Filed March 12, 1937     3 Sheets-Sheet 3
Fig. 10
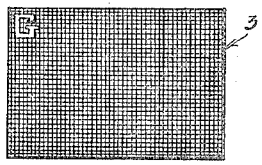
Fig. 14
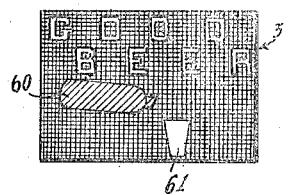
Fig. 9
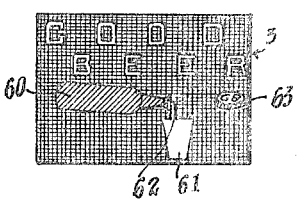
Fig. 11
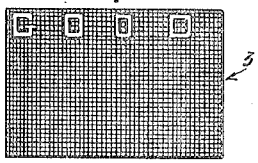
Fig. 15
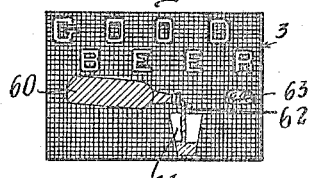
Fig. 12
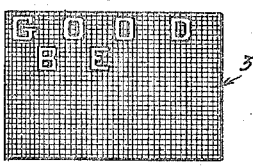
Fig. 16
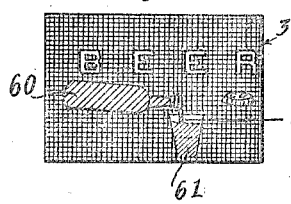
Fig. 13
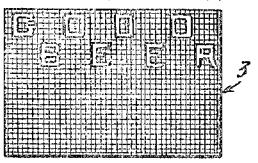
Fig. 17
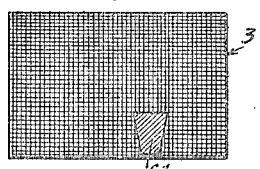
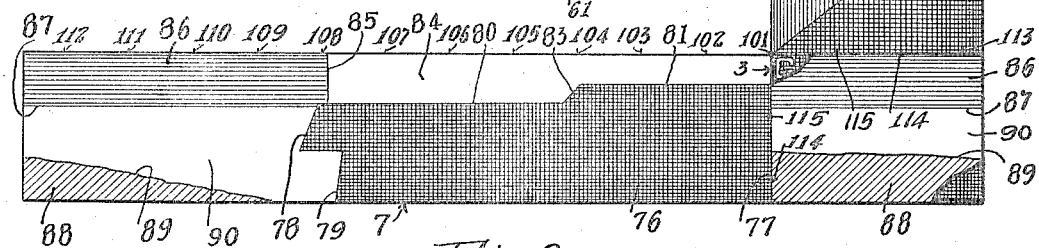
Fig. 8
INVENTOR.
Vernon T. Bugge
BY Lyon & Lyon
ATTORNEYS Patented Aug. 16, 1938

2,126,729

UNITED STATES PATENT OFFICE 2,126,729

DISPLAY DEVICE

Vernon T. Bugge, Los Angeles, Calif., assignor of one-half to Claude W. McAnally Application March 12, 1937, Serial No. 130,527

4 Claims. (Cl. 40—132)

This invention relates to display signs of the animated type used extensively for advertising purposes.

A broad object of the invention is to provide an animated sign that is simple, reliable and compact and is capable of producing unusual attention-attracting visual effects.

A more specific object is to provide a simple and inexpensive display device for simulating the appearance of flowing liquid.

Various more specific objects of the invention will appear from the following description:

Essentially a display sign in accordance with my invention comprises a transparency screen bearing a suitable design and illuminated from the rear with one or more moving curtains positioned back of the screen and having transparent and opaque sections for varying the illumination of the screen in a predetermined manner. The screen is preferably rectangular and the two curtains are preferably in the form of endless loops extending around the source of illumination, one of the loops being mounted for vertical movement past the screen and the other being mounted for horizontal movement past the screen.

A particular embodiment of the invention will now be described in detail with reference to the drawings, in which Fig. 1 is a perspective view of a complete device in accordance with the invention;

Fig. 2 is a longitudinal vertical section through the device;

Fig. 3 is a horizontal detail section showing the support of one of the tensioning rollers in the device;

Fig. 4 is a detail elevation view of the guide shown in section in Fig. 3;

Fig. 5 is a detail view of a portion of a curtain employed in my device showing the construction thereof;

Fig. 6 is a horizontal sectional view taken in the plane VI—VI of Fig. 2;

Fig. 7 is a transverse sectional view taken in the plane VII—VII of Fig. 6;

Fig. 8 is a schematic diagram showing the two curtains employed in the device developed in a single plane to explain how they cooperate to produce desired visual effects;

Fig. 9 is a front view illustrating the appearance of the screen without the curtains; and Figs. 10 to 17, inclusive, show the appearance of the screen with the curtains in different positions of operation.

As shown in the perspective view of Fig. 1, the invention comprises a closed cabinet 1 having six rectangular sides. The bottom, top, side and rear walls are preferably solid and may be constructed of steel or wood. The front wall 2 has a window therein of slightly smaller dimensions than the wall and within or back of the window there is mounted a transparency screen on which a design to be displayed appears.

Referring to Fig. 2, the transparency screen may consist of a plate 3 of glass or other transparent material having a suitable design painted on one side thereof with opaque paint. The screen 3 is adapted to be illuminated by an electric lamp 4 positioned rearwardly thereof within the cabinet 1. To render the design on the transparency 3 more completely invisible when the screen is not illuminated, a plate 5 of opalescent glass or other translucent material is preferably positioned immediately in front of the screen 3.

To cause the lamp 4 to variably illuminate various areas on the screen 3 in predetermined order, two endless curtains 6 and 7, respectively, are mounted within the cabinet 1 on rollers so that they can be moved past the screen 3 immediately back thereof. The curtain 6 is mounted for movement vertically back of the screen 3 and the curtain 7 is mounted for horizontal movement back of the screen. The two curtains 6 and 7 are so supported that they move in parallel paths closely adjacent to each other and to the screen 3.

The vertically extending curtain 6 is supported on rollers 8, 9, 10, 11, 12 and 13, rollers 8 and 9 being positioned immediately back of the front wall of the cabinet adjacent the upper and lower edges thereof, and the rollers 12 and 13 being positioned adjacent the rear wall of the cabinet. The curtain 6 passes exterior of rollers 8, 9, 12 and 13 in a closed loop but is carried down in a reverse loop between the rollers 10 and 12 and under the roller 11, the latter being adjustably mounted for vertical movement and serving as a tensioning roller to permit adjustment of the tension of the curtain.

Thus referring to Figs. 3 and 4, it will be observed that the ends of the roller 11 are provided with supporting shafts 15 extending therebeyond which rotate in bushings 16, which bushings fit in slots 17 in frame members 18. Each bushing 16 is provided with a head 16a and a nut 16b whereby it may be clamped in any desired vertical position on the frame member 18.

The horizontally extending curtain 7 (Fig. 6) is similarly mounted upon rollers 20, 21, 22, 23, 24 and 25, these rollers all extending vertically, rollers 20, 21, 22 and 23 being positioned at the four corners of the cabinet and the roller 24 being adjustably mounted in slots 26 in guide bars 27 in a manner similar to the adjustable roller 11. Each of the rollers 8, 9, 10, 12, 13, 20, 21, 22, 23 and 25 is of substantially the same construction and is provided with short supporting shafts extending from opposite ends thereof, which shafts are journaled in bearing apertures provided therefor in angle frame members 28, 29, 30 and 31 positioned in the four side corners of the cabinet. The lower angle members 28 and 31 rest on the floor of the cabinet and the upper angle members 29 and 30 are supported from the lower members by uprights 32, 33, 34 and 35 positioned adjacent the front and rear ends of the angle members. The upper angle members 29 and 30 are supported in spaced apart relation with respect to each other by bolts 36 and 37 and the lower angle members 28 and 31 are supported in spaced apart relation by bolt members 38 and 39. A base member 40 is also connected at its opposite ends to the angle irons 28 and 31, this base member 40 serving as a support for a motor 41 which is employed to drive the curtains.

Referring now to Fig. 5, each of the curtains 6 and 7 comprises an endless belt or ribbon 42 of flexible transparent material, such as Celluloid, flexibly connected at its edges by links 43 to drive chains 44. The chains 44 ride on sprockets 45 positioned on each of the curtain-supporting rollers and function as positive connecting links to force all the rollers associated with each curtain to move in synchronism and thereby drive the curtain. One roller of each set is positively driven by the motor 41. Thus referring to Fig. 6 the motor 41 is provided with a sprocket 50 which is coupled by a chain 51 to a sprocket 52 on the roller 13. Roller 13 has on its opposite end a beveled gear 53 which meshes with a beveled gear 54 on the lower end of roller 25 associated with the horizontal curtain 7. Roller 13 associated with the vertical curtain 6 is therefore directly positively driven by the motor 41 and it in turn positively drives the vertical roller 25 associated with the horizontal curtain 7. The roller 13, through the sprockets 45 thereon, the chains 44 associated with the vertical curtain 6 and the sprockets 45 on the rollers 9, 8, 10, 11 and 12, positively drives the latter rollers. Likewise the roller 25, through the sprockets 45 thereon and the chains 44 associated with the horizontal curtain 7, positively drives the rollers 24, 23, 22, 21 and 20 through the sprockets 45 on those rollers.

In operation the electric lamp 4 is energized from any suitable source of electric current and the motor 41 is set in operation by energizing it from the same source of current used for the lamp 4. Thereupon light from the lamp 4 is projected through the moving curtains 6 and 7 onto the transparency screen 3, variably illuminating the latter according to the designs on the curtains 6 and 7. The vertical curtain 6 moves downwardly back of the screen 3 and the horizontal curtain 7 moves from left to right as viewed from the front of the cabinet.

Referring now to Fig. 8, the schematic diagram of Fig. 8 indicates designs that may be employed on the curtains 6 and 7, respectively, and Fig. 9 indicates a design for use on the screen 3 which cooperates in a peculiar manner with the designs of the curtains 6 and 7, as illustrated in Fig. 8. In the latter view the two curtains 6 and 7 are shown developed with their leading ends overlapping each other and overlapping the screen 3, only a small portion of which is illustrated in Fig. 8, the remainder being broken away to show the design of curtain 7. The lower right-hand corner of the curtain 7 is in turn broken away to show the underlying portion of the vertical curtain 6.

Referring to Fig. 9, the particular design for screen 3 therein depicted consists of two horizontal rows of letters in the upper half of the screen, the letters being transparent on an opaque or black ground and an outline of a bottle 60 in pouring position above a glass 61 on the lower half of the screen. The area within the outline of the bottle 60 is translucent but of a dark brown color to simulate a brown bottle. The area within the outline of the glass 61 is transparent and a narrow transparent slot 62 connects the upper margin of the glass 61 with the mouth of the bottle 60. A bottle cap 63 is also shown but it has no particular significance.

The vertical curtain 6 consists of an opaque section 70 extending from the bottom of the curtain (as shown developed in Fig. 8) to a diagonal line 71, a translucent red section 73 extending from the diagonal line 71 to a transverse line 72 and a translucent section 74 (having a longitudinal amber stripe 75 thereon) extending from the transverse line 72 to the bottom of the opaque section 70.

The horizontal curtain 7 comprises an opaque section 76 extending longitudinally from a vertical line 77 to two diagonally extending lines 78 and 79 and extending laterally from the lower margin of the curtain to two longitudinal lines 80 and 81 which are interconnected by the diagonal line 83; a clear section 84 extending laterally between the lines 80, 83 and 81 and the upper margin of the curtain and extending longitudinally between the vertical line 77 and a vertical line 85 which is adjacent to the lines 78 and 79; a section 86 tinted blue extending laterally from the upper margins of the curtain to a line 87 which is substantially a continuation of the line 80 and extending longitudinally from the vertical line 85 to the vertical line 77; a section 88 tinted amber which is roughly triangular in shape and bounded by the lower margin of the curtain, a portion of the line 77 and an irregular or wavy diagonal line 89; and a transparent section 90 which is bounded by the lines 89, 77, 87, 78, and 79.

It is to be understood that by virtue of the fact that the curtains 6 and 7 are positively interconnected through the bevel gears 53 and 54 on rollers 13 and 25, respectively, (Fig. 7) they move in synchronism with each other to always maintain the same relative positions. In order to show the relative positions of the two curtains 6 and 7 relative to the screen 3 in various phases of operation of the device, corresponding points on the two curtains have been indicated on the margins thereof by the numerals 101 to 115, respectively. Thus when any one of these points on either curtain is in registration with the upper left-hand corner of the screen 3, the correspondingly numbered point on the other curtain will also be in registration with the upper left-hand corner of screen 3.

With the curtains 6 and 7 in the positions shown in Fig. 8, points 101 on the two curtains are in registration with the upper left-hand corner of the screen 3. In this position the opaque section 70 of curtain 6 completely covers the screen 3 and no image appears on the screen.

Now assume that the curtain 7 moves to the right and the curtain 6 moves downwardly until the points 102 on the two curtains are in registration with the upper left-hand corner of the screen 3. In this position the clear portion 84 has begun to uncover the upper row of letters on the screen and likewise the movement of the curtain 6 has carried the left end of the diagonal line 71 below the first letter "G" in the upper row. Therefore, the sign will have the appearance shown in Fig. 10 in which the entire screen is black except for the letter "G" which appears in red by virtue of the fact that the section 73 of curtain 6 is tinted red.

As the curtains continue to move, more and more of the letters in the upper row are uncovered but the letters in the second row are still concealed by the opaque portion 76 of the horizontal curtain 7, the upper boundary line 81 of which is positioned between the two rows of letters. Thus by the time the points 104—104 on the two curtains are in registration, the entire upper row of letters will be exhibited in red as shown in Fig. 11 but the remainder of the sign will still be concealed by the opaque portion 76 of curtain 7. However, following continued movement of the curtains the diagonal line 83 on the curtain 7 begins to move past the lower row of letters on the screen, successively uncovering and exhibiting those letters as shown in Fig. 12 which discloses the appearance of the sign when the points 106—106 on the curtains are in registration, and Fig. 13 which represents the appearance of the sign when the points 108—108 on the two curtains are in registration. Up to and a little past the point 106 the letters appear red by virtue of the fact that they are illuminated through the red portion 73 of the vertical curtain 6. However, following movement from the position shown in Fig. 12, the line 72 on the curtain 6 traverses first the upper row and then the lower row of letters and the light shines unimpeded through the section 74 of curtain 6 and the section 84 of curtain 7, causing the letters to appear in white. If desired, the letters in screen 3 instead of being clear may be tinted very lightly with some color so that they appear tinted instead of white following the movement of the red section 73 of curtain 6 therepast.

However, the letters remain white for only a short interval following passage of the line 72 past the upper portion of the screen for the reason that slightly before the points 108—108 on the two screens are in registration the blue section 86 of the horizontal curtain 7 begins to move across the screen. As this section moves across the screen, it successively changes the colors of the letters in the two rows from white to blue. When the curtains have reached the position in which the points 110—110 are in registration (Fig. 14), the first three letters in the upper row and the first two letters in the lower row will have changed to blue but the remaining letters will still be white. Continued movement of the curtains changes all the letters in both rows to blue and they remain blue until the end of the cycle.

The lower half of the screen remains dark and appears blank until slightly after movement of the curtains from the positions shown in Fig. 13 in which the points 108—108 are in registration, whereupon the clear area 90 of the horizontal curtain 7 begins to uncover the bottle 60. Thus as shown in Fig. 14, the bottle is partially uncovered and in Fig. 15, in which the points 112—112 on the two curtains are in registration, both the bottle 60 and the glass 61 have been completely uncovered by the movement therepast of opaque section 76 of curtain 7. By virtue of the fact that the opaque section 76 of curtain 7 is bounded on the left end by the staggered lines 78 and 79, the glass 61 is completely uncovered simultaneously with the uncovering of the mouth of the bottle 60 and the clear slot 62 extending downwardly from the bottle mouth to the glass 61. Just at this time the amber stripe 75 in the clear section 74 of curtain 6 registers with the slot 62 and moves downwardly past the glass 61. The movement of this amber stripe 75 gives the appearance of a stream of amber liquid flowing from the bottle 60 into the glass 61. The amber stripe 75 is so positioned with respect to the screen 3 that it passes between the letters in the upper part of the sign and does not alter the color or appearance of the lettering.

The synchronization of the two curtains 6 and 7 is such that just as the lower end of the stripe 75 reaches the bottom of the glass 61 the amber colored triangular section 88 of curtain 7 begins to move into registration with the lower end of glass 61, thereby creating the illusion that liquid is pouring into the glass and filling it. When the curtains are in such position that the points 112—112 thereon are in registration, the glass has begun to fill as shown in Fig. 15. As the movement of the curtains continues the upper margin of the amber section 88 moves upwardly toward the top of the glass 61. As previously noted, the upper margin of section 88 is irregular or wavy. This produces the illusion of waves at the surface of the liquid in the glass 61 as the latter fills.

By the time the curtains have reached the position at which points 114—114 are in registration, the glass 61 is almost covered by the amber colored section 88 of curtain 7 and in this position the lower margin of the opaque section 70 of the vertical curtain 6 has begun to block out the upper portion of the sign. Thus in Fig. 16 it will be observed that the upper row of letters has disappeared. The downward motion of the curtain 6 next blocks out the letters in the lower row and thereafter begins to block out the bottle 60. By the time the horizontal curtain 7 has advanced far enough to carry the upper margin 89 of the amber colored section 88 to the top of the glass 61, the lower margin of the opaque section 70 of the curtain 6 has dropped to the upper edge of the glass, completely blocking out the bottle and the stream of liquid flowing therefrom. Thereafter the glass 61 is gradually blocked out from top to bottom and by the time the cycle is completed and the curtains restored to the position shown in Fig. 8, the entire sign has been blocked out.

It should be noted that by the use of the diagonal boundary line 71 on the vertical curtain 6 and the diagonal boundary line 83 on the horizontal curtain 7, the letters in the upper and lower rows are made to appear in the same manner despite the fact that the letters in the upper row are uncovered for view by the vertical curtain 6 and the letters in the lower row are uncovered by the movement of the horizontal curtain 7. In each case, to one viewing the sign, the letters seem to be uncovered by drawing a curtain diagonally across the screen from the upper left-hand to the lower right-hand corner.

The amber colored stripe 75 on curtain 6 is preferably of irregular density to more realistically simulate a column of liquid flowing from the bottle into the glass. The amber stripe 75 is also preferably of slightly irregular outline and of less width than the slot 62 so that the column of liquid appears to wave back and forth as it flows.

It is to be understood that additional color effects other than those described may be obtained by employing suitable colors in overlapping portions of the two screens such that they combine to produce a third color. The various color combinations that can be obtained by mixing two different colors are well known and need not be discussed here.

Although the invention has been explained by describing in detail a particular embodiment thereof, many variations in the particular structure shown will occur to those skilled in the art and the invention is to be limited only to the extent set forth in the appended claims.

I claim:

1. A display device comprising a transparency bearing a design to be displayed, a source of light positioned back of said transparency, a pair of overlapping curtains between said source of light and said transparency, each curtain having different portions of different light-transmitting characteristics, and means for simultaneously moving said two curtains in different angularly disposed directions past the transparency in timed relation for variably illuminating different portions of said transparency in predetermined order.

2. A display device comprising the transparency bearing a design to be displaced, a source of light positioned back of said transparency, and means for varying the illumination of said transparency by said light source comprising a first endless curtain and means for movably supporting it in a closed path about said light source, a portion of the path extending in a vertical plane between said source and said transparency, a second endless curtain and means for movably supporting it in a second closed path about said source for movement at an angle to said first path, a portion of the second path extending in a vertical plane between said source and transparency, said curtains having predetermined different portions of different light-transmitting characteristics, and means for moving said two curtains through their respective paths in predetermined synchronous relation whereby they cooperate to variably illuminate selected different portions of said transparency screen in predetermined sequence.

3. A display device for producing the illusion of liquid flowing into and filling a container comprising a screen having opaque and transparent portions, the latter defining a source of liquid flow, a container and a liquid flow path from the source to the container, a source of light back of said screen, a downwardly movable curtain positioned between said screen and said light source, said downwardly movable screen having an area adapted to register with said path of liquid flow on said screen, said area being tinted to simulate a liquid, a horizontally movable curtain positioned between said light source and said screen and having a translucent area tinted or shaded to simulate a liquid and so positioned and shaped relative to said container depicted on said screen as to successively register with an expanding area of the container beginning at the bottom of the container, and means for moving said two curtains synchronously in such phase relation as to produce the illusion of liquid flowing into and filling said container.

4. A screen comprising translucent and opaque portions defining successive rows of characters, a light source back of said screen, a first curtain between said screen and source, and means for supporting said curtain for movement past said screen in a direction normal to said rows, said first curtain having opaque and translucent sections intersecting along a line extending diagonally across the curtain, a second curtain between said screen and source and means for supporting it for movement past said screen in a direction parallel to said rows, said second screen having opaque and translucent sections intersecting along a line extending parallel to the rows and between two of said rows, and means for moving said two curtains synchronously in such phase relation that the diagonal edge of the translucent section of the first curtain successively uncovers characters in one of said rows while the characters in another row are covered by the opaque section of the second curtain, the characters in said other row being subsequently uncovered by continued movement of the second curtain.

VERNON T. BUGGE.